Patented Mar. 8, 1949

2,463,571

UNITED STATES PATENT OFFICE 2,463,571

VINYLIDENE CHLORIDE-BUTADIENE-ISOBUTYLENE INTERPOLYMERS

George William Stanton and Charles Everett Lowry, Midland, Mich., assignors to The Dow Chemical Company, Midland, Mich., a corporation of Delaware No Drawing. Application May 16, 1946, Serial No. 670,280

1 Claim. (Cl. 260—92.5)

This invention relates to vulcanizable interpolymers suitable for use in the manufacture of synthetic rubber shoe soles, molded rubber articles, mechanical rubber goods, calendered films and coatings for flexible base materials. It relates in particular to certain interpolymers of vinylidene chloride, butadiene-1,3 and isobutylene.

The binary copolymers of butadiene-1,3 and vinylidene chloride are disclosed and claimed in U. S. Patents Nos. 2,215,379, 2,376,208 and 2,380,356, issued to the assignees of Sebrell, Tucker and Youker, respectively. The binary copolymers of butadiene-1,3 and isobutylene have been suggested at numerous places in the prior art and some of them are commercial products.

The binary copolymers of vinylidene chloride and butadiene-1,3 as well as the corresponding copolymers of vinylidene chloride and isoprene vary from rigid thermoplastic and highly insoluble materials at high vinylidene chloride concentrations above 90 per cent through strong rubbers having from 20 to 50 per cent and more of butadiene or of isoprene. At least when some of the commoner polymerization methods are employed, the binary copolymers of vinylidene chloride and either butadiene-1,3 or isoprene, containing roughly from 60 to 90 per cent of the diene hydrocarbon, are factice-like solids of rather low strength which are capable of but little elongation. The binary copolymers of butadiene-1,3 or of isoprene and isobutylene, especially in those proportions in which isobutylene predominates, are special purpose synthetic rubbers suitable for such uses as the manufacture of inner tubes for automobile tires and for similar applications. The binary copolymers of vinylidene chloride and isobutylene have not been described in any detail in the prior art. In common with most other copolymers of vinylidene chloride they are rigid and substantially insoluble materials at high vinylidene chloride concentrations. Of the three binary polymer systems above-identified that of vinylidene chloride and isobutylene is neither vulcanizable nor rubbery. The two binary polymer systems named containing a diene hydrocarbon, especially when the amount of such hydrocarbon is over 15 per cent, are vulcanizable materials. Many of them, however, are unsuited for the manufacture of molded rubber articles or of mechanical rubber goods. Few of them, if any, are satisfactory for use in the manufacture of highly flexible calendered coatings for paper, cloth and other flexible bases, or for use as extruded coatings on wire.

It is an object of the present invention to provide a vulcanizable synthetic rubber-like material which is adapted to form abrasion resistant and moisture impervious sheets and coatings, preferably by the relatively simple process of calendering the material on the desired base. Another object is to provide such a composition suitable for use in the manufacture of molded or extruded rubber articles. A related object is to provide a vulcanizable synthetic rubber-like material which is resistant to abrasion and to the action of many common chemicals and organic solvents and which is adapted for use in the manufacture of shoe soles or other articles where low resilience is desired. Other and related objects may appear hereinafter.

In the following description and claims the term "butadiene" is understood to signify the compound butadiene-1,3. The term "isoprene" refers to the compound 2-methyl-butadiene-1,3. Isobutylene is the compound sometimes referred to as isobutene or as 2-methyl-propene. The term "interpolymer" is used herein to mean the product obtained by the polymerization of a mixture of three or more monomers. To distinguish therefrom, the term "copolymer" is arbitrarily used herein to designate a product similarly derived from a mixture of two monomers.

It has now been found that the foregoing and related objects may be attained through the provision of the ternary interpolymers produced from a monomeric mixture of from 30 to 80 per cent vinylidene chloride, from 15 to 50 per cent of the diene hydrocarbon and 5 to 35 per cent of isobutylene. In its preferred modification the invention comprises the provision of an interpolymer of from 35 to 70 per cent vinylidene chloride, from 25 to 45 per cent of the diene hydrocarbon and from 5 to 25 per cent of isobutylene.

The ternary interpolymers of the present invention are most conveniently made by the emulsion polymerization process, preferably employing a mildly alkaline aqueous medium as the continuous phase of the emulsion. The new interpolymers have also been made in emulsion using the acidic conditions and catalyst described by Britton and LeFevre in U. S. Patent No. 2,333,633. They have also been made in aqueous suspension, without emulsifying agents, using benzoyl peroxide as the catalyst. For the present purposes of comparison between the various compositions in the interpolymer system under consideration, a standard polymerization procedure was adopted eliminating as far as possible any variations due to changes in relative concentrations of the disperse and continuous phases, catalysts, temperatures, emulsifiers, alkalies and the like. The standard procedure for small scale preparations is as follows:

A stock solution is prepared consisting of 98.5 per cent by weight of pure water, one per cent of a purified grade of sodium lauryl sulfate and 0.5 per cent of sodium carbonate. To 75 parts by weight of the aqueous stock solution is added 25 parts by weight of the chosen monomers in the proportions being investigated, and 0.125 parts of potassium persulfate is added as a catalyst. The mixture is emulsified by agitation and is kept at a constant temperature of 55° C. in a sealed vessel until polymerization has progressed to the desired extent. There is then added a small amount, suitably about 0.4 per cent, of an antioxidant, such as polymerized trimethyl dihydroquinoline. The latex is then coagulated after dilution with water, by addition of a 50 per cent aqueous methanol solution containing 0.4 per cent of magnesium chloride. The coagulum is washed with water and vacuum dried at 70° C. overnight. When making batches involving more than about a gallon of reaction medium the amount of monomer is increased to about 33.3 per cent of the weight of the emulsion and the stock solution is correspondingly fortified to contain about 1.5 per cent of the emulsifying agent and 0.75 per cent of sodium carbonate. The catalyst concentration is increased correspondingly to about .165 per cent.

The new interpolymers may be used either in their natural state, or after being compounded, for the purpose of applying coatings to flexible base materials or for the preparation of moldings, sheet or film. A wide variety of formulations may be employed to yield satisfactorily compounded materials from the new interpolymers. For the purposes of the present description, and in order to obtain representative and comparable values in those tests carried out on compounded and vulcanized batches of the present ternary interpolymers, a standard procedure was developed and a standard formulation was employed. That formulation contained the following ingredients in the designated parts by weight:

| Ingredient | Parts |
|---|---|
| Interpolymer | 100 |
| Stearic Acid | 1 |
| Butyl phthalyl butyl glycolate (plasticizer) | 10 |
| Litharge | 5 |
| Benzothiazyl disulfide (accelerator) | 1 |
| Sulfur | 2 |
| Carbon Black | 35–40 |

(The preferred carbon blacks were selected from the class of "easy processing" channel blacks and "semi-reinforcing" furnace blacks.)

In preparing the test formulations, the interpolymers are first broken down on a cold mill, the addition agents are milled into the interpolymer in the order named, and the mixture is sheeted from the mill. It may be sheeted directly to a calender stack where the compounded sheet is brought into contact with a sheet of paper, cloth, or other flexible base material which it is desired to coat, and the assembly is passed through the stack to effect a reduction in thickness of the coating and to insure the provision of a uniform and continuous coating on the flexible base. The compounded sheet may also be fed from the mill through the calender stack without a supporting base material, thus providing a thin sheet or film of the compounded interpolymer. It is generally found desirable to cure the calendered films or coated or molded articles, before they are adapted to use in commerce. Such cure can be effected at about 138° C. with or without the application of superatmospheric pressure (suitably up to 400 pounds per square inch) for periods up to about 75 minutes.

The new interpolymers, containing isobutylene in the proportions recited above, have lower internal friction during fabrication than does the binary copolymer of 70 per cent vinylidene chloride and 30 per cent butadiene (hereinafter referred to for purposes of comparison as copolymer A). This reduced internal friction, which makes for greater ease of fabrication in processes involving calendering or extrusion, is evidenced by the Mooney viscosity values of the new interpolymers, determined in the manner described in India Rubber World for April 1, 1935, at page 49. The new interpolymers which are most readily milled, extruded and molded are those containing from about 5 to about 25 per cent isobutylene, from 25 to 45 per cent butadiene and from 35 to 70 per cent vinylidene chloride.

The new interpolymers in the same range of proportions which exhibit the lowest Mooney viscosities also exhibit minimum resilience as measured by the Bashore rebound test. In this test copolymer A gives an average value of about 15 per cent whereas the previously defined interpolymers containing from 5 to 25 per cent of isobutylene give values ranging from 8 to 12 per cent.

In the uncompounded and uncured condition sheets, films or coatings of the new interpolymers do not become brittle until they are chilled to temperatures below −70° C. Thus, films of the interpolymer of 60 per cent vinylidene chloride, 30 per cent butadiene and 10 per cent isobutylene in the crude state have a brittle point of −73° C. and interpolymers of from 25 to 35 per cent isobutylene, 30 per cent butadiene and correspondingly from 35 to 45 per cent of vinylidene chloride give films with brittle points of about −100° C. Uncured films of copolymer A have a brittle point of about −50° C. These values indicate a marked superiority of the present interpolymers for any use requiring low temperature flexibility, as compared with most other known synthetic rubber-like materials. They also indicate that the new interpolymers are more flexible at temperatures ordinarily encountered than are most previously known synthetic rubbers.

Films and coatings produced from the new interpolymers have very low moisture transmission values. When this property is considered together with the low temperature flexibility of such films and coatings, the use of the new materials as wrappings or containers for foodstuffs to be stored in the frozen condition is suggested. For such purpose the films or coatings may be prepared either by the conventional calendering process or by direct deposition from the latex in which they were first obtained after polymerization. For this use, it is not only necessary to have low temperature flexibility and a high moisture resistance but it is also desirable to have a wrapping material which may readily be torn from the frozen article when the period of storage has ended. The wrapping should be sufficiently tough, however, to prevent unintentional tearing during handling and storage. The new interpolymers, in the ranges of proportions set forth above, meet these requirements. Films of these interpolymers have considerably lower tear resistance, as measured by A. S. T. M. D624—41T, than do films of copolymer A. As an indication of the satisfactory toughness of the present films, an arbitrary unit of toughness (obtained by multiplying the elongation values of the films in per cent by their tensile strength in pounds per square inch and dividing the product by 1,000) is used. The new films have toughness values in the range from 125 to 300. Interpolymers containing more than the recited maximum of 35 per cent isobutylene or less than the recited minimum of 30 per cent vinylidene chloride and either more or less than the recited limits for the diene hydrocarbon have toughness values of less than 75 of the defined arbitrary units.

The new interpolymers are suitable for use as insulating materials, especially where low frequency currents are encountered. Thus, while the per cent power factor of copolymer A has an average value of 10.7, that of the new interpolymers ranges downward to about 1.25. The dielectric constant of the same interpolymers, measured at 1,000 cycles per second, is in the general range of about 4.5, which is a value commonly encountered in synthetic rubber materials.

In their resistance to the action of acids, bases and many other chemical substances, the new interpolymers are at least as satisfactory as the commercially available synthetic rubbers.

Samples of the new interpolymers were molded to form discs of 2 inch radius 100 mils thick and, after being carefully weighed, were mounted on the rotating table of an abrasion testing machine and were subjected to the abrasive action of special grinding wheels under a total load of 1,000 grams. The table of the testing machine was rotated for 500 cycles, after which the samples were brushed and reweighed. In this test copolymer A had an average weight loss of .0016 gram. The interpolymer of 60 per cent vinylidene chloride, 30 per cent butadiene and 10 per cent isobutylene had a weight loss of .0002 gram. Thus, it is observed that in the preferred range of interpolymer proportions the new materials have an interesting combination of low viscosity, high abrasion resistance, low resilience and flexibility at low temperatures. Such a combination is very desirable in the manufacture of synthetic rubber shoe soles as well as the manufacture of a number of other rubber goods, particularly for mechanical uses. The low resilience is of especial value wherever a rubber-like material must be stitched and will thereafter be subjected to flexing, as it assists in preventing the stitches from cutting through the rubber. The low viscosity simplifies the manufacturing operation, since with this property it is possible to have very short production cycles, especially in molding operations. The advantage of a highly abrasion resistant material for the described purposes is believed to be apparent.

When the interpolymer of 55 per cent vinylidene chloride, 30 per cent butadiene and 15 per cent isobutylene is compounded and cured in the manner previously described the products are found to have permanent set values of only 4 per cent, while similarly compounded and cured articles produced from copolymer A have a residual permanent set of 8 per cent. Compounded and cured articles of the same new interpolymer have tensile stress values at 100 per cent elongation of about 1130 pounds per square inch. In contrast thereto, the products from copolymer A have a corresponding value of only 785 pounds per square inch.

The preceding examples in which specific compositions have been identified, have been based on ternary interpolymers containing 30 per cent of butadiene. Tests have shown that comparable results are obtained when the butadiene content varies in the previously defined preferred range of from 25 to 45 per cent and that the interpolymers containing from 15 to 50 per cent butadiene in the broad range of proportions initially disclosed all show advantageous properties in comparison with the corresponding adjacent binary copolymers of butadiene and vinylidene chloride. Similar advantage may be shown for the new ternary interpolymers containing isoprene, in comparison with the corresponding vinylidene chloride-isoprene copolymers.

We claim:

A vulcanizable interpolymer made by dispersing in water and polymerizing together a monomeric mixture of 60 per cent vinylidene chloride, 30 per cent butadiene-1,3 and 10 per cent of isobutylene.

GEORGE WILLIAM STANTON.
CHARLES EVERETT LOWRY.

REFERENCES CITED

The following references are of record in the file of this patent:

UNITED STATES PATENTS

| Number | Name | Date |
| --- | --- | --- |
| 2,325,984 | Sarbach | Aug. 3, 1943 |
| 2,373,753 | Fryling | Apr. 17, 1945 |
| 2,376,014 | Semon | May 15, 1945 |
| 2,388,372 | Stewart | Nov. 6, 1945 |
| 2,400,036 | Wooddell | May 7, 1946 |